United States Patent [19]
Hoffman

[11] 3,772,695
[45] Nov. 13, 1973

[54] FALSE NULL DETECTION IN AUTOMATIC TRACKING SYSTEMS

[75] Inventor: Dale M. Hoffman, Palm Bay, Fla.
[73] Assignee: Harris-Intertype Corporation, Cleveland, Ohio
[22] Filed: Mar. 22, 1972
[21] Appl. No.: 237,147

[52] U.S. Cl. ............... 343/7 A, 343/7.4, 343/16 M
[51] Int. Cl. .............................................. G01s 9/22
[58] Field of Search ................. 343/7 A, 7.4, 16 M

[56] References Cited
UNITED STATES PATENTS
3,573,820  4/1971  Bohacek ........................... 343/7 A

*Primary Examiner*—T. H. Tubbesing
*Attorney*—Donald R. Greene

[57] ABSTRACT

When operating properly, automatic tracking antennas lock to a null in the tracking pattern that is spatially coincident with the boresight axis of the antenna. Other pattern nulls (false nulls), not coincident with the boresight axis, exist in the sidelobe region of the antenna's pattern. By moving the antenna off an acquired target a fraction of one beamwidth, and sampling several antenna parameters at the new angular location, this invention determines whether a given lock point is true (mainlobe lock) or false (sidelobe lock). One salient feature of this design is that the true/false decision is based solely upon information contained within the pattern of the system's tracking antenna and, thus, does not require the support of an auxiliary aperture.

12 Claims, 7 Drawing Figures

FALSE NULL DETECTION IN AUTOMATIC TRACKING SYSTEMS

FIELD OF THE INVENTION

The present invention relates to automatic tracking radar, communications or telemetry systems, and more particularly to the elimination of false tracking nulls through the addition of control, measuring, and decision circuitry to the tracking loops of those systems which are typically composed of the system antenna, tracking receivers, and servo.

BRIEF DESCRIPTION OF PRIOR ART

Radar and communication systems track automatically by generating servo error commands from antenna difference patterns of the type illustrated in FIG. 1. In addition to the difference pattern tracking null (12), located on the antenna boresight axis, several other nulls or patterns zero crossings (14 and 16) can be seen in the figure. These false nulls, which are suitable for tracking when target signals are strong, invariably result in erroneous tracking data and often provide an unsatisfactory communication signal.

Prior art solutions to the problem have eliminated false tracking nulls through the use of auxiliary antennas with beamwidths much larger than that of the main system antenna. The antenna, receiver chain, processing electronics, and decision circuitry required by this approach add considerable complexity to the basic system design which severely impacts system cost, calibration and maintenance requirements, and reliability. Additionally, the solution is effective only over the limited spatial region covered by the beamwidth of the auxiliary antenna (often only a few degrees). Since test data has shown that false lock points exist within an extremely wide region about boresight, this limitation alone makes the approach highly unsatisfactory.

BRIEF DESCRIPTION OF THE PRESENT INVENTION

The present invention provides three separate and distinct services to an automatic tracking system: 1) it recognizes a false lock when it occurs so that the system will not attempt to operate on a null located in the antenna's sidelobes, 2) it recognizes the boresight null when encountered which allows the system to confidently perform its intended function and, 3) it aids the system in finding the boresight null after a false null has been acquired.

The recognition functions are accomplished by allowing the system to lock a target to a given null and then, by moving the antenna slightly about the target location, measuring several pattern parameters. These parameters: error voltage gradient, error voltage gradient symmetry, and interchannel crosstalk, are measured at locations slightly (approximately one-half beamwidth) above, below, left and right of the target. Based upon the measured values obtained, a decision is made as to whether the null is true (boresight) or false (sidelobe).

One method of achieving the required antenna movement, relative to the target, is to cause the system servo to move the antenna in discrete steps to the desired measurement locations. An alternate method, which is faster, is to cause the servo to scan a circle about the target and sample the continuously monitored parameter measurements at the correct antenna positions.

If the null decision is "true," the system is allowed to proceed with its normal tracking and data collection functions. If the null is found to be false, the system is aided in finding the boresight null by one of two means depending upon the characteristics of the target to be tracked.

One method of finding the boresight null employs a series of concentric circular scans to form a search pattern while the sum channel signal strength is monitored. This particular scan pattern has been found to be highly efficient since pattern symmetry results in false null points being located on concentric closed curves about the boresight axis of the antenna. These curves are very nearly circular for some distance from boresight, and their radii can be predetermined as a function of the antenna beamwidth.

A second method of spatially acquiring the boresight null, after a false null has been encountered, applies to the class of systems that acquire targets as they appear over the horizon. In this case, sum channel signal strength is measured while the system is locked to a false null. Because of the known difference between on-axis antenna gain and the gain afforded by the highest sidelobe for a particular antenna, knowledge of the sum channel signal level on a false null allows the precise adjustment of an acquisition threshold in the sum channel receiver. After the threshold has been adjusted, the tracking system is returned to the scan mode that was in operation at the time of sidelobe acquisition with the assurance that only the boresight null can now be acquired. In addition to the automatic threshold adjustment, a manual adjustment is provided which allows the threshold to be set without locking to a sidelobe. This feature is used when precise a priori signal strength information is available for a particular target; this makes the sum channel sidelobe signal level measurement and the pattern parameter measurements unnecessary.

The present invention may be included as an integral part of the original design of a particular tracking system, or it may be added as a modification to systems already in existence.

DETAILED DESCRIPTION OF THE INVENTION

Figure 1:
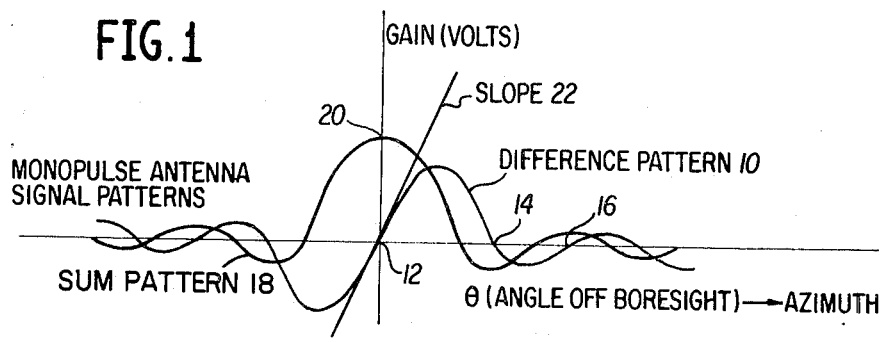
FIG. 1 is a plot of Gain vs Azimuth for the sum and difference patterns of a monopulse antenna signal.

Referring to the figures and more particularly FIG. 1 thereof, a plot is illustrated for monopulse antenna signal patterns. A first characteristic pattern is a difference pattern 10 which generally resembles a damped sinusoidal signal intersecting the Gain and Angle Off Boresight axes at 12. This point denotes the center or correct null. Point 12 is at an angle of zero degrees off boresight. Points 14 and 16 indicate subsequent zero crossings of the azimuth axis, these points indicating false nulls. Although the notation of this figure ("sum" and "difference" patterns) implies a simultaneous lobing (monopulse) system, it is also representative of other techniques employed to generate a null pattern; for example, the feed nutation approach used by conical scan systems.

A second pattern in the form of a sum pattern 18 is superimposed upon the plot. The sum pattern 18 can be generally characterized as a damped cosine function. The maximum point of the sum pattern 18 occurs at point 20 which is at a zero angle off boresight which is the position for the center null. The two patterns work together with the difference pattern providing tracking error signals which allow the system servo to keep the antenna pointing at the target such that the sum pattern peak can be used for communication purposes.

It is to be emphasized that the plot of FIG. 1 represents the azimuth channel of the received signal. A similar plot can describe the second channel or elevation signal received by the antenna. Only the azimuth channel has been shown for convenience.

The patterns of FIG. 1 have distinctive parameters. For example, the difference patterns have characteristic slopes at each ordinate, as typically illustrated by 22. As will be explained hereinafter, the slope parameter is employed in the technique of the present invention to determine whether an antenna is at the center null.

Once an antenna locks to a target, it is imperative to determine whether the antenna is tracking in response to a false null or the center null. This determination is made by measuring the parameters of the difference pattern as illustrated in FIG. 1. Generally, the parameter measurements will first be taken for one channel such as azimuth, and then parameter measurements will be made for the second channel.

It can be sufficient to make the null decision based on measurements of only one parameter. However, under certain circumstances, it may be desirable to measure several parameters of the difference pattern to enhance decision reliability. Thus, when a null is locked to, the slope of the difference pattern can be determined at the acquired null. If the slope is the same as it would be at zero angle off boresite at point 12 (FIG. 1), then it can be determined that the center null has been acquired. If, on the other hand, the slope differs from that of point 12, then the decision can be rendered that a false null has been acquired.

It should be pointed out that the parameter measurement is made with the antenna displaced slightly from the true target position. This displacement (approximately one-half of the antenna beamwidth) moves the target relative to the pattern boresight Another parameter which is determinative of a true vs. false null is interchannel crosstalk. When the antenna is moved in azimuth only, little or no voltage change should occur in the elevation channel since the antenna is locked on a null in the elevation axis. As the interchannel crosstalk is measured, it will be found that the crosstalk signal is greater at a false null than at the center null. Thus, if the crosstalk signal exceeds a predetermined threshold, which is based upon the crosstalk level at the center null, the system can ascertain that a false null has been acquired.

It is to be emphasized that this initial technique of parameter measurement is for the purpose of ascertaining whether the antenna is locked to a false or a center null. The present invention includes a second step for finding the center null once a false null has been encountered.

By recognizing that false nulls occur approximately symmetrically in concentric rings about an antenna beam center, means have been provided for returning an antenna to the center null.

Figure 2:
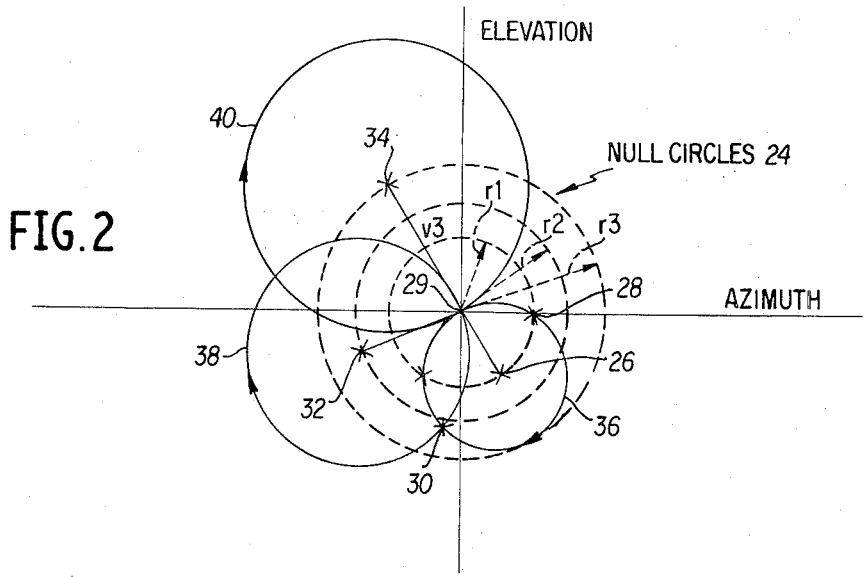
FIG. 2 is a plot of circular scans from false null points, the scans being employed to locate the center null.

FIG. 2 illustrates a plurality of concentric null circles 24 which occur about the intersection of the elevation and azimuth axes. For example, a first concentric circle of radius $r_1$ can entrain false nulls 26 and 28. The center or correct null occurs at the intersection of the elevation and azimuth axes, indicated by reference numeral 29. A second larger concentric circle of radius $r_2$ can entrain false null points 30 and 32.

If parameter measurements have made it clear that a false null is locked to, that full null serves as the center for a number of concentric circular scans. One of these scans will intersect the center null 29, at which point the system will enable the antenna to correct its position.

To explain the technique visually, reference is made to circular scan 26 of radius $r_1$. If the antenna was locked to false null 26, the scan circle 36 would intersect in the center null after completion of one scan. Consider the situation when the system is locked to false null 32. Since the system is unable to determine exactly what radius is required for the scan circle, the system initiates a scan procedure by scanning at the smallest possible radius $r_1$. While measurements are made by apparatus to be discussed hereinafter, it is determined that the center null had not been intersected. Therefore, a second circular scan is made with the next larger possible radius $r_2$. This of course is the requisite radius for intersection of the center null. As the scan intersects the center null, system measurements would indicate that fact.

If the system locked to false null 34, a first scan would be made with a circle of radius $r_1$. After it had been determined that the center null had not been intersected, the second concentric scan with center 34 would be made with radius $r_2$. Again, intersection of the correct or center null would not happen. As a result, a third concentric scan 40 with a larger radius $r_3$ would be made and this of course would intersect the center null.

Accordingly, by determining the radii at which the null circles occur relative to the center null 29, it is possible to incrementally generate circular scans of these radii until the center null is intersected.

In operation of the system, while circular scans are made, the system apparatus samples the signal strength from the sum pattern 18 (FIG. 1). The sampled signal strength forms a time waveform. Computations are made of rms value and of the sample peak of the waveform. A ratio is computed of signal strength peak divided by rms. If the ratio exceeds a preselected threshold, the circuitry decides that a center null has been found. This decision is based upon the known gain difference between the sum pattern boresight peak and the maximum gain of sidelobe peaks. The system records or memorizes the position where the threshold was exceeded. Then, a servomechanism returns the antenna to that very position. This objective is accomplished by monitoring antenna position as a function of time and returning the antenna to the position corresponding to the time at which the peak of the signal was measured.

It should also be mentioned that the second step, which involves the computation of sum pattern signal strength to rms ratio, is merely one computational method for determining the boresight location. Any equivalent method can be employed which recognizes that the sum pattern 18 (FIG. 1) is maximum at zero angle off boresight. For example, the ratio of scan signal peak to sum signal level at the false null could be used for the threshold decision.

Finally, as a check, after the antenna is locked to the center null, a parameter check is made as initially done to insure that the antenna has returned to the center null. If this parameter check indicates that it has not, the second step is repeated to recycle for additional circular scanning.

It is to be emphasized that the first step of parameter measurement for determining acquisition of a center or false null can be used with various procedures for returning an antenna to the center null from a false null. Therefore, rather than employ the second step of circular scanning, an alternate method of returning the antenna to the central null can be used. One such alternate approach is to desensitize the antenna receiver when a parameter measurement determines that a full null is locked. The receiver is desensitized by reducing the actuation threshold of the receiver, to the level measured at the false lock point, which effectively blanks out false nulls including the one that the receiver is locked to as well as all sidelobes with lower signal strength.

Because the gain difference between the sum pattern boresight peak and that of the highest gain sidelobe is known for a given antenna, the threshold can be increased many dB above the sum signal level measured at the false lock point. This additional threshold increase (perhaps 10 or 15 dB for high gain antennas) blanks out sidelobes with signal levels above that of the false lock point encountered. In most cases, a single threshold adjustment will negate all false lock points. In the rare instance of extremely high signal level, a second iteration of the process may be required, depending upon the gain level of the sidelobe first encountered.

FIG. 3-7 illustrate in block form the system that comprises the apparatus for carrying out the steps of the false null elimination technique described.

Figure 3:
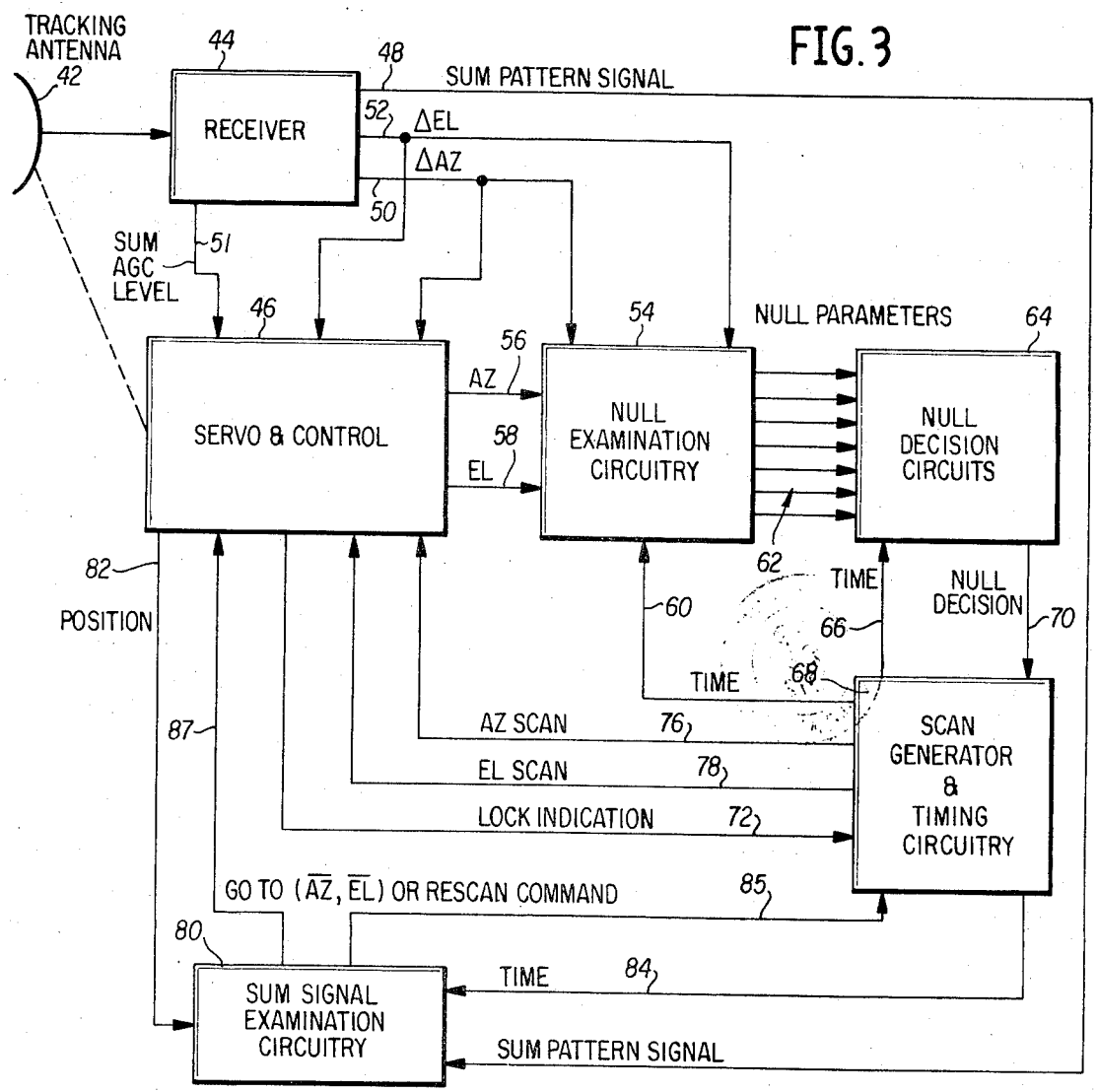
FIG. 3 is a general block diagram of the present system.

FIG. 3 illustrates the general block diagram of the system. A tracking antenna 42 drives a conventional monopulse receiver 44. The antenna 42 is positioned in azimuth and elevation by a servo and control unit 46 in the conventional manner based upon azimuth and elevation error signals. Although the block diagram of FIG. 3 illustrates antenna movement in two directions, namely, azimuth and elevation, it is to be understood that operation about other axes would be achieved in the same manner for system configured around x-y, polar, or other types of pedestal mounts.

The sum pattern signal appears at a first output 48 of a receiver 44. This signal is processed when correction of antenna position from a false null is to be effected as later explained. A second output 50 carries the azimuth error signal ($\Delta Az$) while a third output 52 from the receiver 44 carries the elevation error signal ($\Delta E1$). The second and third outputs drive null examination circuitry 54 and the system servo. $\Delta E1$ and $\Delta Az$ are voltage values derived from the difference signal pattern (FIG. 1) for respective channels. The servo and control unit 46 delivers instantaneous azimuth and elevation position information along leads 56 and 58, respectively. Null examination is periodically made by gating the circuitry 54 into operation through a time control lead 60. The null examination circuitry 54, to be discussed hereinafter, produces a number of null parameters along output leads 62 which are examined by the null decision circuits 64. It is the purpose of the null decision circuits 64 to decide whether a null locked to by the tracking antenna 42 is the center null or a false null. Time control of the null decision circuits 64 is effected through the time enable lead 66.

A scan generator and timing circuitry 68 provides the timing signals along leads 60 and 66. The null decision circuits 64 produce a binary signal along output lead 70 that indicates whether a center null or a false null has been acquired by the tracking antenna 42. A lead 72 connects the output of the servo and control unit 46 to the scan generator and timing circuitry 68. This lead serves as a lock indication which initiates generation of timing signals from the scan generator and timing circuitry 68. The lock indication is developed in the servo and control unit by monitoring the sum channel AGC level 51.

After the antenna 42 has locked to a target and a lock indication along lead 72 is generated, appropriate scan signals are carried from the output of scan generator and timing circuitry 68 to the servo and control unit 46. These latter mentioned scan signals represent azimuth scan and elevation scan signals which control movement of the servo and control unit 46. These scan signals are in addition to the normal error signals and thus a measurement scan is superimposed about the moving targets position. At points above, below, left, and right of the target, parameter measurements are made.

If the null decision circuits 64 determine that a false null has been acquired, the second step of the present technique, namely circulr scans (not to be confused with the measurement scans) along the null circle of FIG. 2 must be made. Accordingly, from an appropriate null decision on lead 70, the scan generator and timing circuitry 68 generates output signals to activate the sum signal examination circuitry 80. The actuation leads include an actuation lead 84 which carries a timing control signal for timing operation of the sum signal examination circuitry 80. In addition, the sum pattern signal 48 from receiver 44 drives a second input of the sum signal examination circuitry 80. A third input is acquired on lead 82 from servo unit 46 in the form of instantaneous position information. As explained in greater detail hereinafter, the circuitry 80 determines when a circular scan intersects the center null (see FIG. 2). If a particular circular scan does not intersect the center null, a RESCAN COMMAND SIGNAL is generated by the circuitry 80 along lead 85 which inputs to the scan generator and timing circuitry 68 that causes this circuitry to initiate a second circular scan of a larger radius. On the other hand, if a particular circular scan does intersect the center null, a command is issued by the circuitry 80 which directs the servo and control unit 46 to go to a particular azimuth and elevation position indicated $\overline{AZ}$ and $\overline{EL}$. This latter mentioned command is carried by lead 87.

With respect to the scan generator and timing circuitry 68, during the first step of parameter measurement, the circuitry 68 generates discrete azimuth and elevation position commands along leads 76 and 78 thereby sequentially producing small position offsets in each axis for parameter measurements. However, during the second step when circular scans are being made to locate the sum pattern peak, the circuitry 68 produces scan signals so that a circular scan by the tracking antenna 42 can be effected. The circuit means for accomplishing these ends are to be discussed in detail hereinafter.

Figure 4:
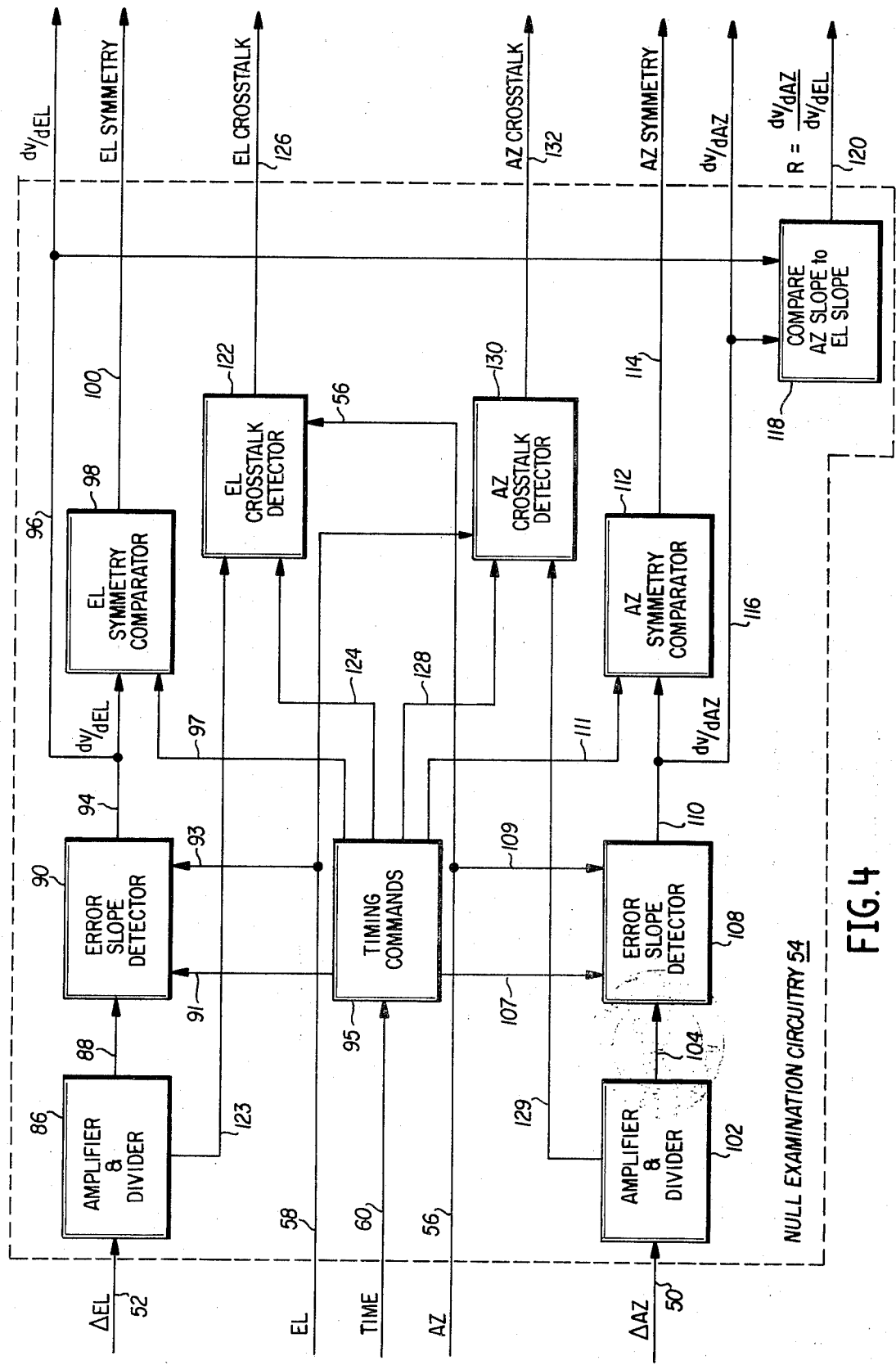
FIG. 4 is a block diagram of null examination circuits as employed in the system.

FIG. 4 illustrates in greater detail the null examination circuitry 54 as previously indicated in FIG. 3. The $\Delta$EL signal drives an amplifier and divider 86 that feeds a signal along lead 88 to an error slope detector 90. The detector is an analog circuit for developing an output signal along lead 94 representing the ratio of volts/degree off boresight. A lead 96 is connected to connecting lead 94 to make available $dv/dEL$ as a parameter for the null decision circuits. In order to generate this output, the detector 90 must be provided with elevation data along lead 58 to an input 93 of the detector 90. In addition, timing commands from unit 95 are conducted along lead 91 to the error slope detector 90 so that the measurement will be synchronized with antenna position via common timing. The timing commands unit 95 receives its driving input along time lead 60 from the scan generator and timing circuitry 68 (FIG. 3). The output from the error slope detector 90 drives the elevation symmetry comparator 98 that is an analog comparator for testing symmetry of the signal patterns about the center null (FIG. 1). An output lead from the comparator 98, indicated by reference numeral 100, carries an analog quantity representative of elevation symmetry.

A similar connection of components is provided for generating parameters on a second channel—the azimuth channel. Accordingly, $\Delta$AZ feeds an emplifier and divider circuit 102 identical to unit 86. The divider 102 is connected via lead 104 to an error slope detector 108 identical to detector 90. The detector drives an azimuth symmetry comparator 112 through lead 110. An analog signal representing azimuth symmetry is carried by lead 114 that is connected to the output of comparator 112. A lead 116 is connected to lead 110 to provide $dv/dAZ$ as a parameter to the null decision circuits. The timing commands unit 95 provides timing signals to the error slope detector 108 along lead 107. An additional input to the error slope detector 108 occurs along lead 109 that carries azimuth information from connecting lead 56.

Another null parameter is generated by an analog comparator 118 which compares azimuth slope to elevation slope and produces a resultant signal along lead 120.

Still another parameter which can be used by the null decision circuits 64 is developed in the elevation crosstalk detector 122 that includes a first input 123 from the amplifier and divider 86. A second input to the detector 122 comes from the timing command unit 95 along lead 124. A third input to the detector 122 comes from control 46 along lead 56. The detector 122 has an output lead 126 that carries an analog signal representing elevation crosstalk.

In a similar manner, azimuth crosstalk is detected by detector 130. The detector 130 is driven through lead 128 by the timing commands unit 95 and a second output 129 from the amplifier and divider 102. A third input to detector 130 comes from control 46 along lead 58.

The detector 130 has an output lead 132 that makes available an analog azimuth crosstalk signal to the null decision circuits 64.

Figure 5:
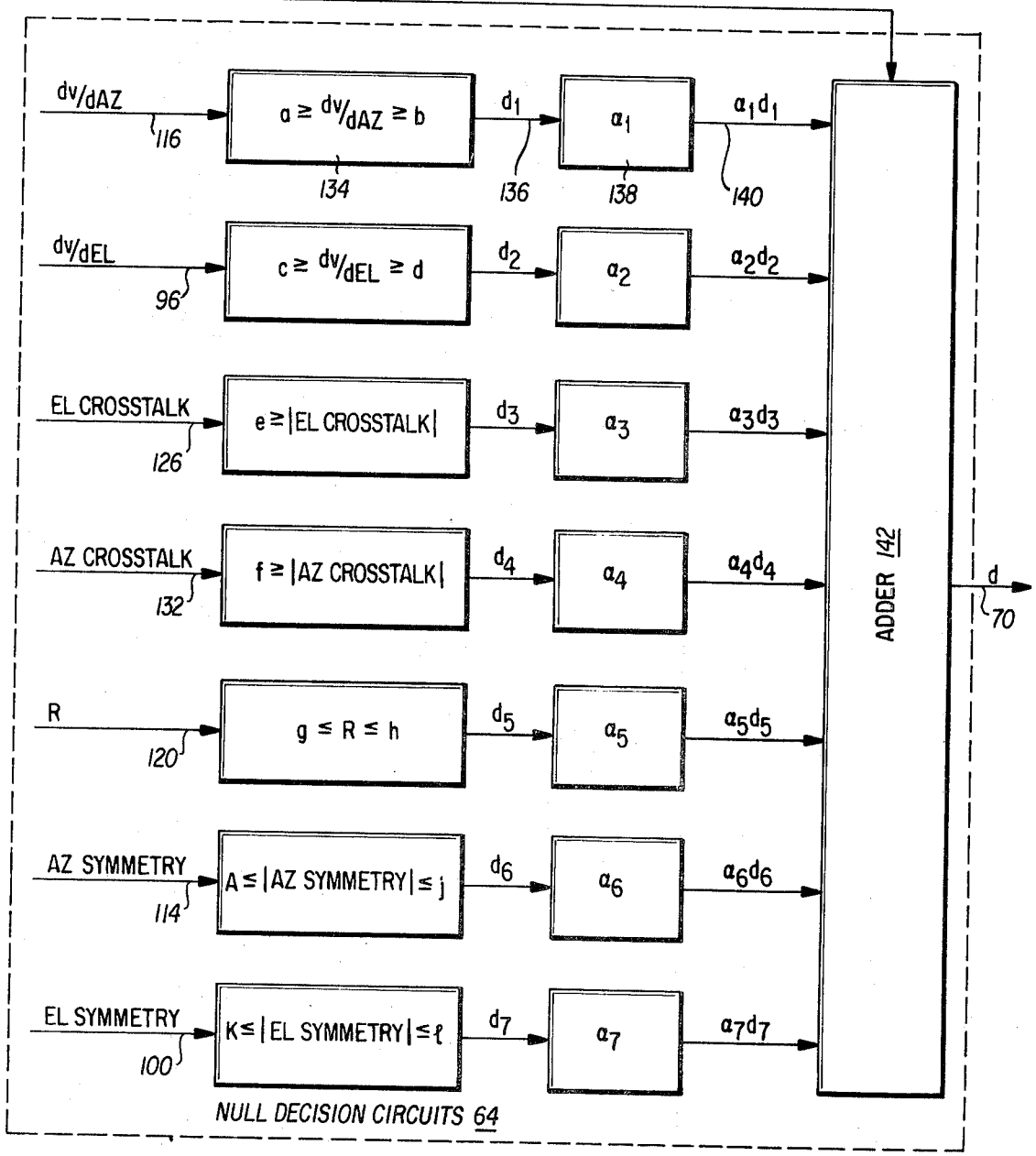
FIG. 5 is a block diagram of null decision circuits as employed in the present system.

Referring to FIG. 5, the parameters provided along leads 96, 100, 114, 116, 120, 126 and 132 appear as inputs to the null decision circuits. Each input goes through a series of decision circuits that are identical in structure. Therefore, for convenience, the circuit path for input $dv/dAZ$ along lead 116 will be explained.

The analog input along line 116 is examined by a window detector 134; the window detector output ($d1$) is a binary 1 if the input falls within the window and a binary 0 if the input is outside the window. The other six parameters indicated in the figure are examined in a similar manner. The window detector outputs ($d1$ through $d7$) serve as "votes" either for or against a false null; weighing functions ($\alpha1$ through $\alpha7$) allow bias to be added to each vote so that the final decision may be made more or less a function of each parameter examined. The adder 142 combines the weighted votes and makes the true/false decision based upon a predetermined decision rule. The value $d$ on output lead 70 will be a binary digit representing the true or false decision. As an example of weighting and decision rule selection, a conceptual design was evaluated against system test data with a high degree of success for $\alpha_1$, $\alpha_2$, $\alpha_3$ and $\alpha_4$ equal to unity, $\alpha_5$, $\alpha_6$, and $\alpha_7$ equal to zero and a decision rule that decided a given null to be false if one or more of the parameters fell outside of the window detector bounds.

Figure 6:
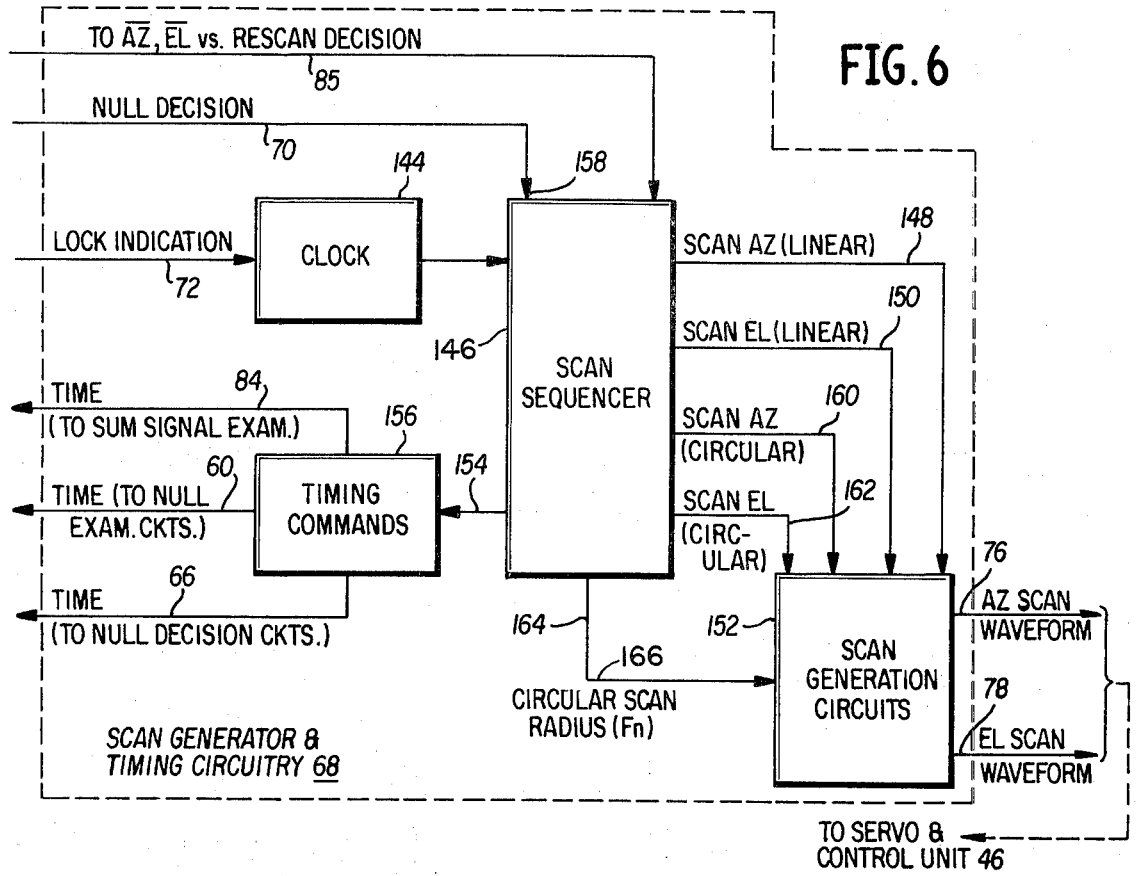
FIG. 6 is a block diagram of a scan generator and timing circuit as utilized in the system.

FIG. 6 illustrates the scan generator and timing circuitry 68. A clock 144 is furnished with an initiate signal along lead 72 which is a servo signal from unit 46 indicating that a null has been locked to. The output of clock 144 drives a scan sequencer 146 which generates a plurality of signals along four output leads that characteristically cause azimuth and elevation scan in a linear direction or circular direction.

In operation of the system, during the first step when the antenna moves to discrete positions for parameter measurement, position commands are generated for azimuth and elevation along output leads 148 and 150, respectively. These commands cause the antenna servo to move up, down, left and right. The leads 148 and 150 command scan generation circuits 152 to direct the servo and control unit 46 (FIG. 3) to dwell at a particular point for a particular time by generating position steps along azimuth scan and elevation scan leads 76 and 78 that govern servo movement.

Although a discrete position step has been indicated for the measurement scan, a circular scan containing the desired measurement positions could also be used with the parameter measurement values sampled at the appropriate time/position. In order to effect circular scans as mentioned above or as required for redirecting the tracking antenna from a false null to a true null, known algorithms can be generated. For example, the azimuth scan waveform can be a sinusoidal function while the elevation scan waveform can be a cosine function.

As indicated in FIG. 6, the scan sequencer 146 has an output 154 that drives a timing commands unit 156 which generates the time signals 84, 60 and 66 previously described in connection with FIG. 3. The scan sequencer 146 has the null decision lead 70 driving an input 158 thereof. A second input 74 drives the scan sequencer 146 as previously described in connection with FIG. 3.

The scan sequencer 146 has outputs 160 and 162 representing circular scan azimuth and elevation leads, respectively. These leads cause the generation of waveforms on leads 76 and 78 that will cause the servo and control unit 46 to effect circular scans of the tracking antenna.

A final output of the scan sequencer 46 is indicated by reference numeral 164 and represents an instantaneous circular scan radius $r_n$. A conductor 166 connects the scan sequencer output 164 to an input of the scan generation circuits 152. Conductor 166 informs the scan generation circuits 152 as to what radius the antenna is to scan.

Figure 7:
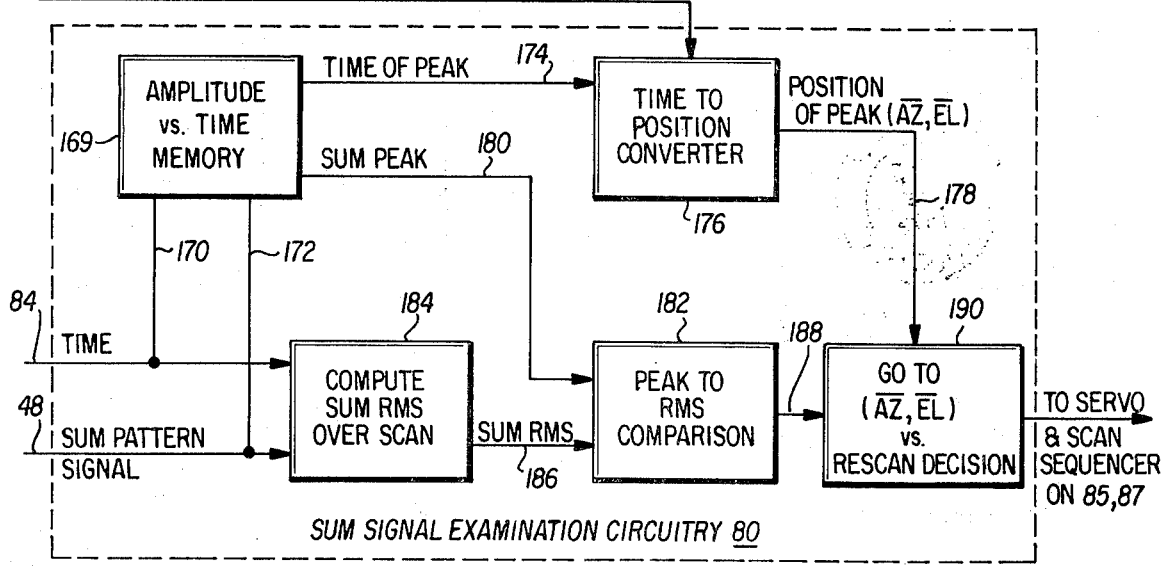
FIG. 7 is a block diagram of sum signal examination circuits for the system.

FIG. 7 illustrates in detail the sum signal examination circuitry 80. The time lead 84 and the sum pattern signal 48 are respectively fed to an amplitude vs time memory 169 at respective inputs 172 and 170. The memory 169 generates a signal along lead 174 at the time when the maximum point of the sum pattern signal occurs. The lead 174 serves as a first input to a time to position converter 176 that determines azimuth and elevation position at the time of the sum signal peak. A second input to the converter 176 is lead 82 that carries the instantaneous antenna position from the servo and control circuits 46. The output of the converter 176 is conducted by lead 178 which carries information regarding the position of the maximum point ($\overline{AZ}, \overline{EL}$) of the sum pattern signal. This information is employed by further circuitry to be discussed.

The memory 169 also furnishes the voltage value of the sum maximum peak along lead 180 that drives a first input of a peak to rms comparison circuit 182. The rms of the sum signal, computed over the period of one circular scan in computation circuit 184, is fed to the comparison circuit 182 through conductor 186. Leads 84 and 48 drive the dual inputs of the rms computation circuit 184.

The output of the comparison circuit 182 is connected to a logic circuit 190. The purpose of the logic circuit is to determine whether leads 85, 87 carry the signal directing the antenna to ($\overline{AZ}, \overline{EL}$) or whether a second circular scan of larger radius is to be ordered. The decision depends on whether a particular circular scan intersects the center null (FIG. 2). This is primarily determined by the comparison circuit 182. More particularly, if the output along lead 188 exceeds a threshold determinative of such an intersecting scan, the antenna will be directed to ($\overline{AZ}, \overline{EL}$) which is the position the antenna traversed when the sum pattern peak was intersected. If the threshold is not exceeded, a second circular scan of larger radius will be ordered.

The purpose of the apparatus described is to provide means for affecting the two steps of the disclosed false null elimination technique. To summarize, the technique includes means for identifying whether a null that is locked to is a center null or a false null. If a false null is acquired, the disclosed system performs a series of circular scans of increasing radius, centered on the acquired false null. When the circuitry has determined when a particular scan intersects the center null, means are provided for redirecting the antenna to the position of the center null wherein automatic and accurate tracking of the target is realized. Alternately, an automatic receiver threshold reduction will blank out false nulls and the antenna will be returned to its normal search scan mode.

It should be understood that the invention is not limited to the exact details of construction shown and described herein for obvious modifications will occur to persons skilled in the art. Also, due to the uniqueness of individual tracking systems, implementation of the invention will necessarily vary according to individual system designs. For example, application to a system employing a digital servo will result in more functions being performed in the digital domain than are indicated for the assumed analog servo application described above.

I claim:

1. A method for automatically tracking a target along the boresight axis of a scanning antenna, which comprises locking the antennas to a null in the tracking pattern, displacing the antenna slightly relative to the lock point to obtain measurements of at least one preselected variable parameter of the antenna signal pattern whose value about the boresight null differs from its value about a false null, repeating the displacement of said antenna to other points relative to the lock point to obtain measurements of said at least one preselected variable parameter at several different points relative to the target, comparing the measured values of said at least one parameter with known values of the same parameter about the boresight null, and scanning said antenna in a preselected mode to acquire a lock on the boresight null when the measured values of said at least one parameter differ from the values about the boresight null by a predetermined amount.

2. The method of claim 1, wherein
measurements are obtained for more than one preselected variable parameter at each of the points of displacement of said antenna, for comparison with known values of the same parameters about the boresight null.

3. The method of claim 1, wherein
the step of comparing measured values includes comparing the measured value of error voltage gradient, error voltage gradient symmetry, and interchannel crosstalk with known values of these parameters about the boresight null.

4. The method of claim 2, wherein
said antenna is moved in discrete steps to the desired measurement points.

5. The method of claim 2, wherein
said antenna is driven in a circular scan about the lock point and said parameter values are measured at precise spatial positions by sampling the parameter values synchronously based upon the scan start time and start position and upon the time waveform used to generate the scan.

6. The method of claim 2, wherein
the comparison of measured values with known values is achieved using window detectors for each measured value, generating a predetermined one of two binary values when the measured parameter value is within the window, exercising a majority vote of the generated binary values, and deciding whether the null is false or at boresight on the basis of the majority vote.

7. The method of claim 6, including
performing normal tracking and data collection functions when the decision is that the antenna lock point is at boresight null.

8. The method of claim 6, wherein
said scanning in a preselected mode to acquire a lock on the boresight null when the decision is that the antenna is locked to a false null, is performed by a series of concentric circular scans at radii derived from the circular symmetry of false null locations, and detecting the point at which the sum pattern is within a predetermined deviation from a known maximum as the desired lock point for tracking at the boresight null.

9. In a system for automatically tracking a target along the boresight axis of a scanning antenna, the combination comprising
means for sampling from the antenna signal pattern at least one preselected variable parameter whose value differs according to whether the antenna is locked to the boresight null or to a false null in the tracking pattern, and
means responsive to the value of each sample of said parameter for detecting the locking of said antenna to a false null.

10. The combination according to claim 9, wherein said system is a monopulse system and said at least one parameter is sampled from the difference pattern of said antenna.

11. The combination according to claim 10, wherein said at least one parameter is selected from one of the difference pattern gradient at the null to which the antenna is locked, the degree of crosstalk in the difference patterns, the symmetry of each difference pattern, and the symmetry between difference patterns in the azimuth and elevation channels of the system.

12. A method for eliminating the locking of a scanning antenna to a false null in an automatic tracking system, comprising
measuring the sum channel signal level while the antenna is locked to a false null,
setting an acquisition threshold level in the sum channel based on the ratio of the sum pattern peak gain to sidelobe gain, and
returning the tracking system to the scanning mode.

* * * * *